United States Patent
Houssian et al.

(12)

(10) Patent No.: US 6,189,417 B1
(45) Date of Patent: Feb. 20, 2001

(54) PICTURE FRAME ASSEMBLY MACHINE

(75) Inventors: Vazgen Houssian, Union City, NJ (US); Eugene Cox, Midlothian, VA (US)

(73) Assignee: Nielsen & Bainbridge L.L.C., Paramus, NJ (US)

( * ) Notice: Under 35 U.S.C. 154(b), the term of this patent shall be extended for 0 days.

(21) Appl. No.: 09/374,883

(22) Filed: Aug. 13, 1999

(51) Int. Cl.[7] .......................... B25B 17/00; B25B 23/02; B25B 23/04; B25B 23/06

(52) U.S. Cl. ............................... 81/57.22; 81/57.4

(58) Field of Search ............................... 81/57.22, 57.24, 81/57.32, 57.36, 57.4

(56) References Cited

U.S. PATENT DOCUMENTS 4,562,756 * 1/1986 Otsuki ..................................... 81/57.4

FOREIGN PATENT DOCUMENTS

41388199 * 5/1993 (DE) ..................................... 81/57.24

* cited by examiner

Primary Examiner—James G. Smith
Assistant Examiner—Hadi Shakeri
(74) Attorney, Agent, or Firm—Darby & Darby

(57) ABSTRACT

A machine is disclosed for assembling a metal picture frame having mitred frame sections connected to each other by L-shaped corner pieces which have legs extending into receiving channels within the frame sections and screws in each leg accessible from the back of the frame through an elongated slot in the frame sections. The machine comprises a base on which a corner of the frame can be supported, and a pair of guide rails on the base for engaging the elongated slots to two adjacent frames sections. A corner brace is provided for securing a corner edge of the frame in a fixed position. Two screw drivers extend through the base at a position in which they are aligned with the corner piece screws when the slots of two frame sections engage the guide rails and the corner edge of the two frame sections engages the brace. A motor attached to the base plate rotates the screw drivers to tighten the screws and thereby fasten the frame sections together.

10 Claims, 6 Drawing Sheets

Fig. 5A Fig. 5B

PICTURE FRAME ASSEMBLY MACHINE

This invention relates to a machine for assembling a picture frame or the like which consists of extruded metal frame sections.

BACKGROUND OF THE INVENTION

A picture frame in common use today is made of extruded aluminum frame sections, each of which includes a receiving channel into which the legs of an L-shaped corner piece can be inserted. The corner piece includes two similarly shaped plates, which can be clamped to adjacent frame sections by tightening a screw in each leg. The screws are accessible through an elongated slot in the back of the frame section.

Heretofore, the assembly of such a frame was a manual process with the framer tightening the screws by hand after the frame sections were aligned. This is a relatively time consuming process and can become tiresome if many frames need to be assembled in a short period of time.

Moreover, when manually assembling a frame, the framer must have access to the back of the frame which means that while the frame is being tightened, he cannot see the position of the art work and mat board within the frame. This can lead to problems of alignment and may require corrective action on the part of the framer, further exacerbating the problems encountered by the framer.

The invention provides a machine which tightens the screws used to clamp the mitred sections of a conventional aluminum frame together. Moreover, the machine functions with the front of the frame (and thus the art work) facing the framer so that before the screws are tightened, the framer can make sure that the art work and mat boards are properly aligned.

SUMMARY OF THE INVENTION

A machine for assembling a conventional metal picture frame wherein at least one screw must be threaded into a corner piece to secure adjacent frame sections together, comprises a base on which a corner section of the frame can be supported, a pair of guide members on the base for engaging complementary openings of two adjacent frame sections, at least one screwdriver extending through the base at a position in which it is aligned with the screw when the openings of the two frame sections engage the guide members, and a motor or the like for rotating the screwdriver to tighten the screw.

BRIEF DESCRIPTION OF THE DRAWINGS

FIGS. 5A and 5B are perspective views of a screwdriver used in a preferred embodiment of the invention;

DETAILED DESCRIPTION

Figure 1:
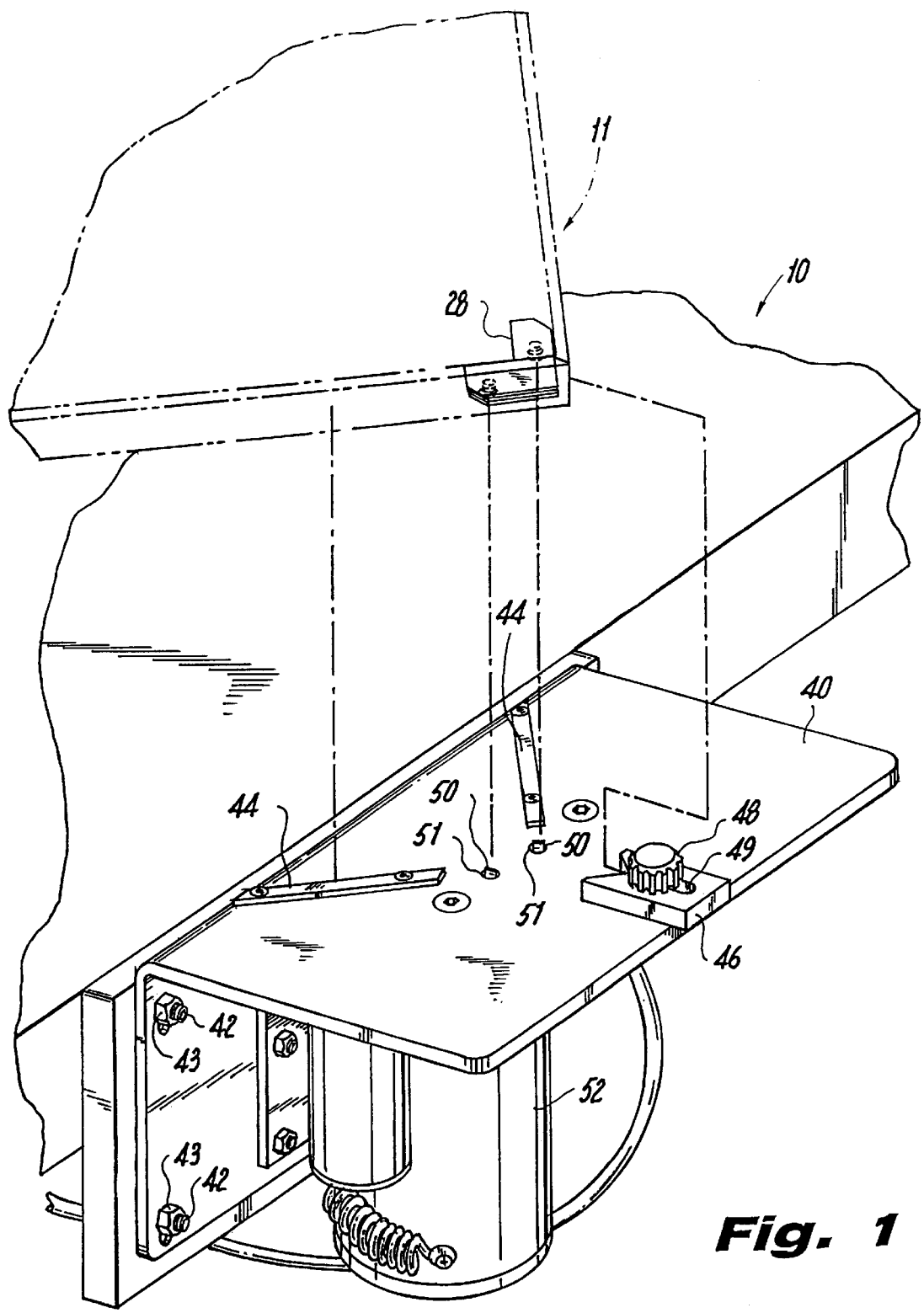
FIG. 1 is a perspective top view of a machine in accordance with the invention.

FIG. 1 illustrates the machine according to a preferred embodiment of the invention attached to a framer's table 10 preparatory to tightening the corner piece in a corner of a conventional metal frame 11.

Figure 2:
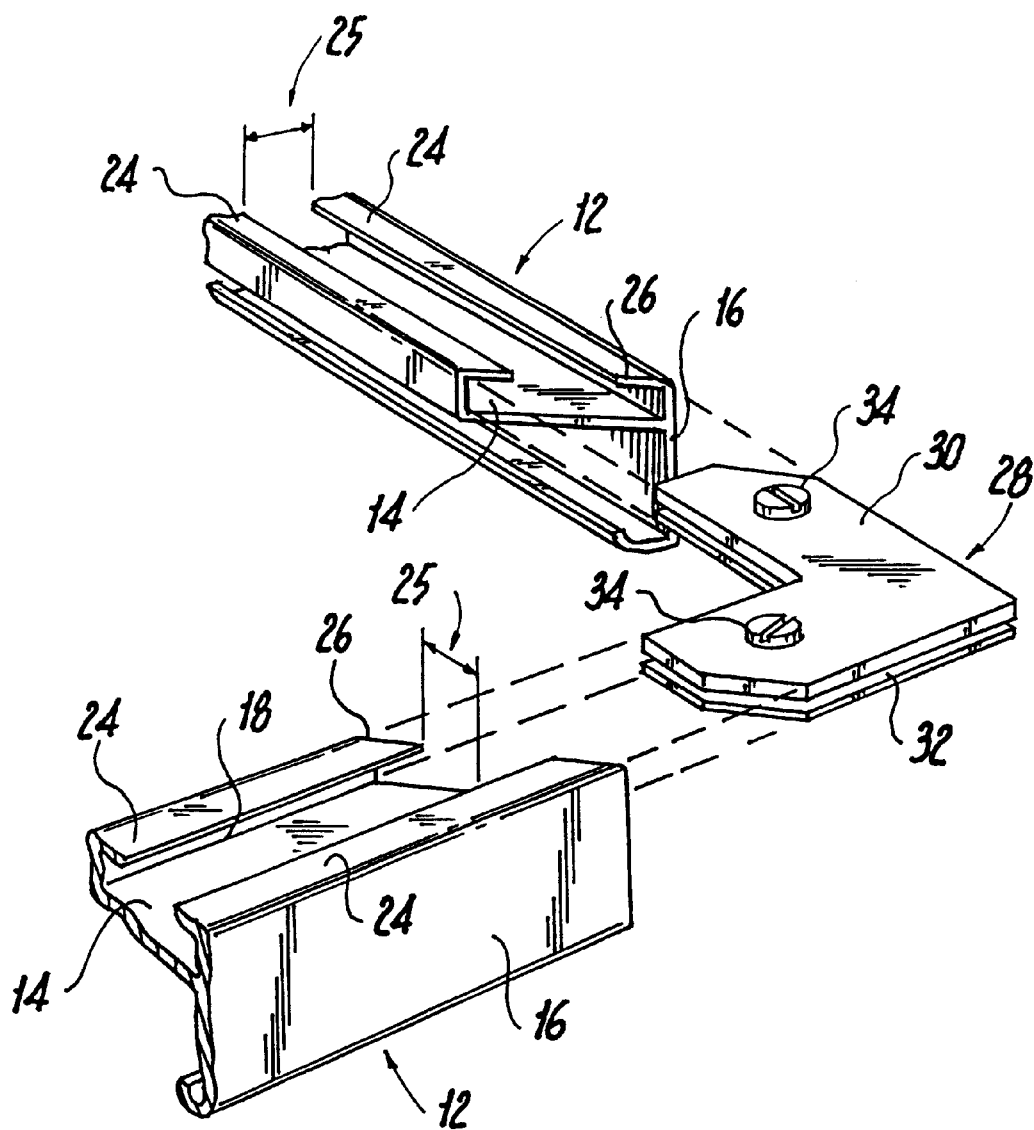
FIG. 2 is an exploded perspective view of a corner section of a frame of the type which would be assembled in accordance with the invention.

A typical metal picture frame comprises four frame sections 12 extruded from aluminum. The frame sections 12 (FIG. 2) have identical cross sections and, as shown in FIG. 2, include an inwardly directed supporting flange 14, an outer wall 16 and a receiving channel 18. The receiving channel 18 is rectangular in cross section and includes two opposed lips 24 which are spaced apart to define an opening or gap 25 extending the length of each section.

Figure 9:
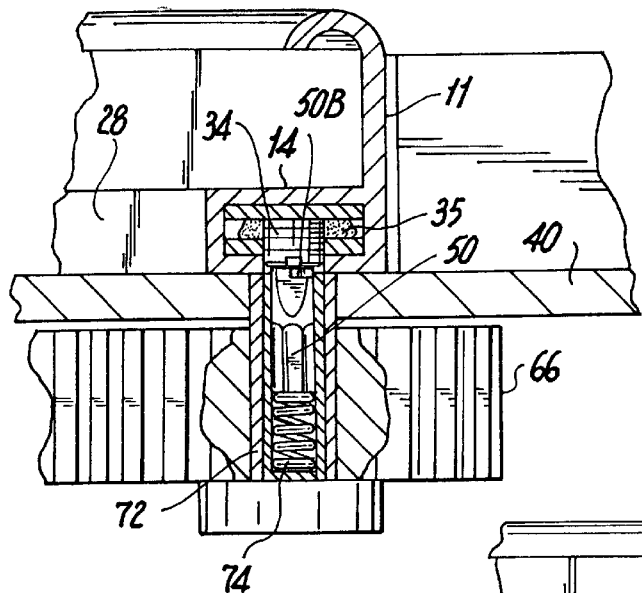
FIG. 9 is a sectional view, along the line 9—9 of FIG. 8.
Figure 10:
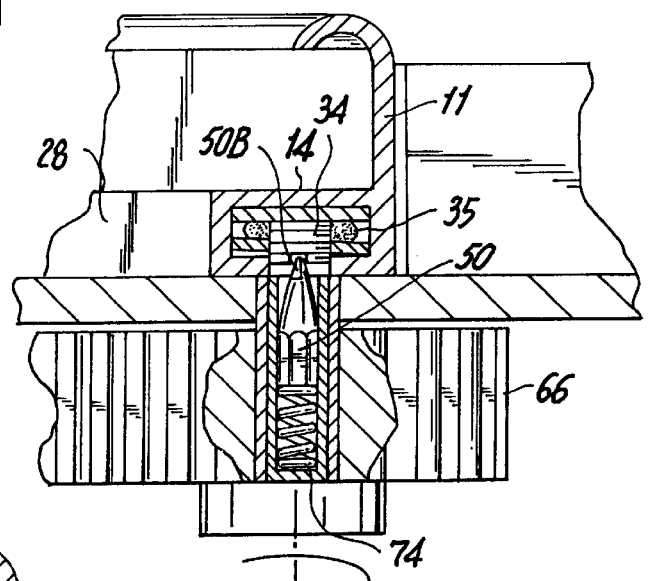
FIG. 10 is a sectional view, similar to FIG. 9, during the frame tightening process; and, FIG. 11 is a section view, similar to FIGS. 9 and 10, after the frame has been tightened.
Figure 11:
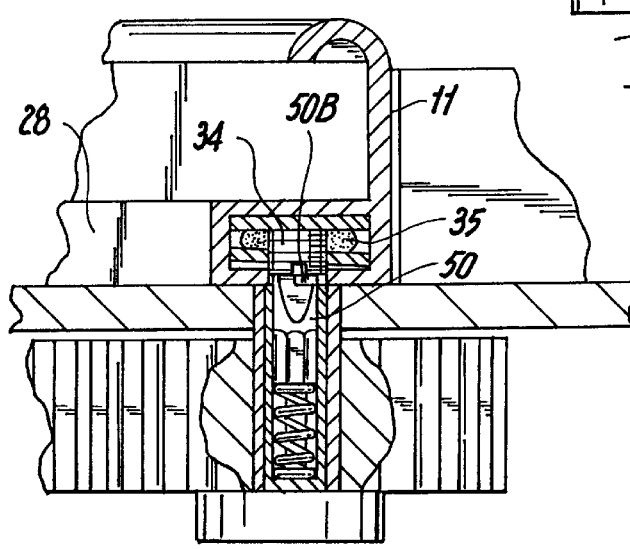

The ends of each section are mitered as illustrated at 26. Adjacent frame sections are joined together at their mitred ends and secured in place by a corner piece 28. The corner piece 28 includes an L-shaped tapped plate 30 and an L-shaped backing plate 32. Tapped plate 30 includes two threaded holes, one in each leg, which receive set screws 34. Plates 30 and 32 may be unattached or, as shown in FIGS. 9–11, attached by an elastomeric adhesive 35. Tightening of the set screws 34 forces the plates 30 and 32 apart thereby clamping the adjacent frame sections 12 together.

The art work, including mat boards and glass is retained within the frame between the supporting flange 14 and the curved forward surface of wall 16 (see FIGS. 9–10).

The essential parts of the machine are shown in FIG. 1. They include an Lshaped base plate 40 which is attached to the framer's table 10 by bolts 42 and nuts 43 or other suitable means. A pair of guide rails 44 are positioned at 90° with respect to each other and secured to the upper surface of base plate 40. The width of each guide rail 44 is slightly less than the gap 25 in each frame section 11. An adjustable corner bracket 46 is provided to engage the outside corner of the frame. Adjustment of the corner bracket 46 is necessary because the distance from the gap 25 to the outer periphery of the frame is not the same for all frames; therefore, the corner bracket must be moveable to ensure tight engagement with the outside corner of the frame being assembled. Its adjustment is controlled by a screw 48 which passes through a slot 49 in bracket 46 into threaded engagement with base plate 40. A pair of screw drivers 50 extend through openings 51 in the base plate 40. As described below, the arrangement is such that when the frame 11 is aligned on the base plate, the screw drivers 50 will be aligned with the screws 34 of the corner piece 28.

A motor 52 is mounted beneath the base plate 40 and may be operated by a foot petal (not shown) so that when the framer has aligned the frame within the machine, motor 52 can be actuated to drive the screw drivers 50, tightening the screws 34 of the corner piece to connect the frame sections together.

Figure 3:
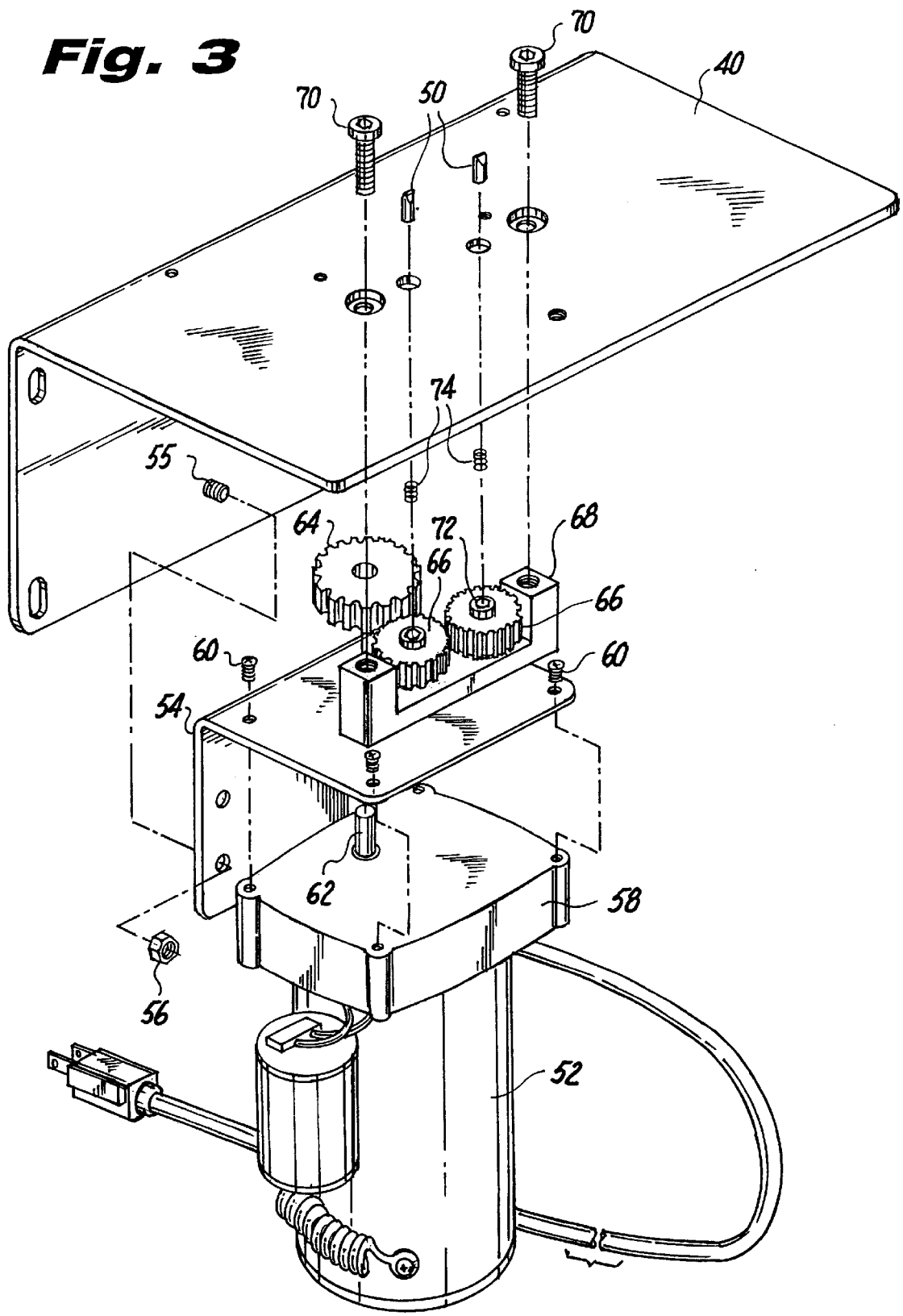
FIG. 3 is an exploded perspective view of the mechanism for tightening the frame.
Figure 4:
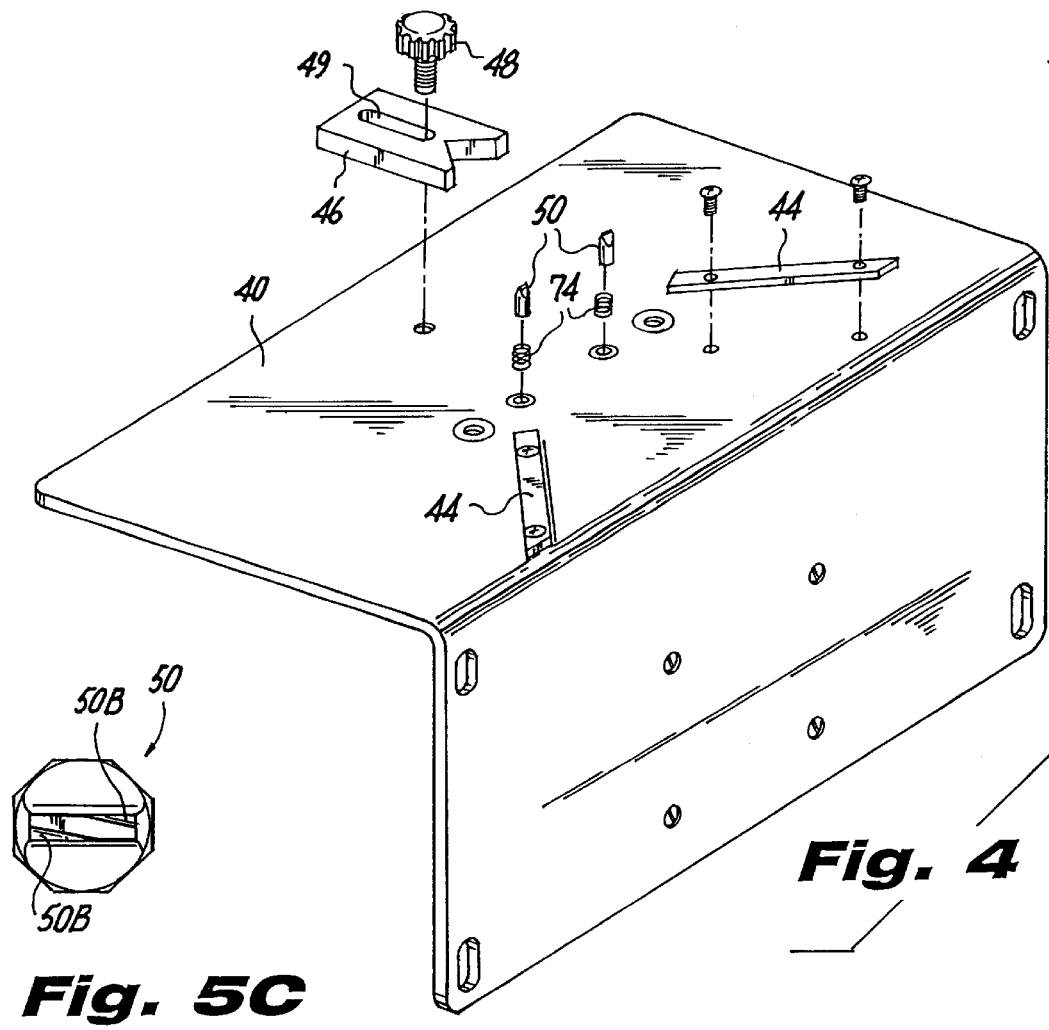
FIG. 4 is an exploded perspective view of the mechanism for positioning the frame in the machine.

FIG. 3 shows the details of the mechanism which drives the screw drivers 50. An L-shaped mounting plate 54 is attached to base plate 40 by means of nuts and bolts 55 and 56, respectively. The motor 52 with a transmission 58 is attached to the undersurface of the mounting plate 54 by means of four retaining screws 60. The output shaft 62 from transmission 58 extends through a hole (not shown) within the mounting plate 54 into engagement with a driving gear 64 positioned between the top of the mounting plate and the undersurface of the base plate 40. A pair of sprockets 66 are journaled in a U-shaped bracket 68 which is mounted on the undersurface of base plate 40 by means of screws 70. The sprockets 66 engage the driving gear 64 so that when motor 52 is actuated, sprockets 66 are both driven in the same direction. The sprockets 66 may be rotatably supported within the cross bar of the bracket 68 in any suitable fashion.

Each of the sprockets 66 contains a screw driver holder 72 which receives a spring 74 and a screw driver 50 which rests on the spring. In this way, the screw drivers are spring biased toward the frame resting on base plate 40. As shown in FIG. 5A, the bottom portion 50A of each screw driver has an hexagonal shape. Each screw driver holder 72 has a complementary shape so that rotation of the sprocket will also rotate the screw driver.

Figure 5C:
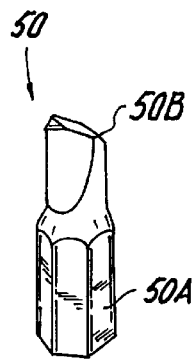
FIG. 5C is a top plan view of a preferred screw driver.
Figure 6:
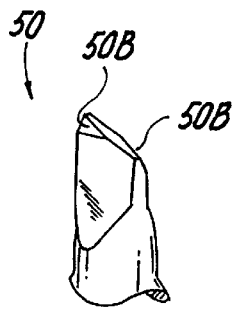
FIG. 6 is a side view, showing the way in which the screwdriver engages a screw.
Figure 6:
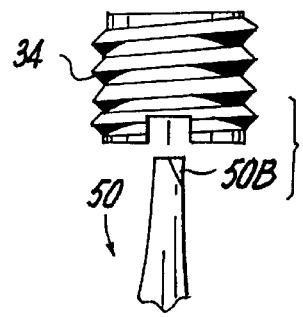

Moreover, as shown in FIGS. 5B and 5C, each of the screw drivers 50 has beveled driving edges 50B which cause the screw driver to be cammed up and out of the slot of a screw after the screw is tightened. As explained in greater detail below, this action prevents over-tightening of the screws.

Figure 7:
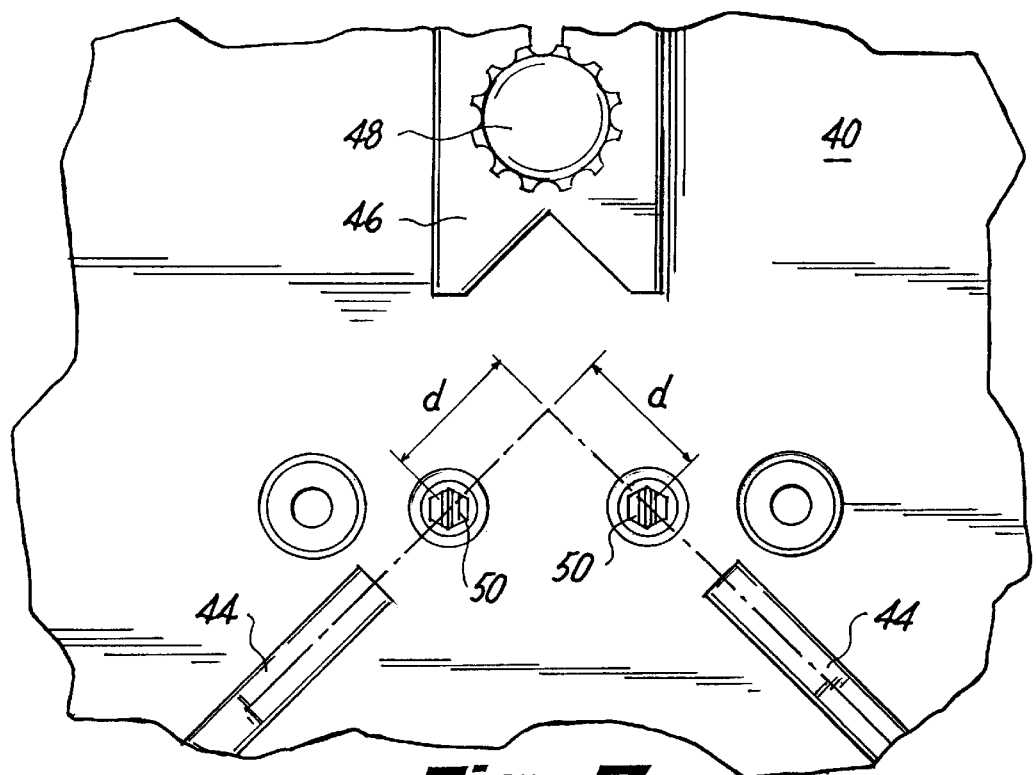
FIG. 7 is a top plan view of the machine.
Figure 8:
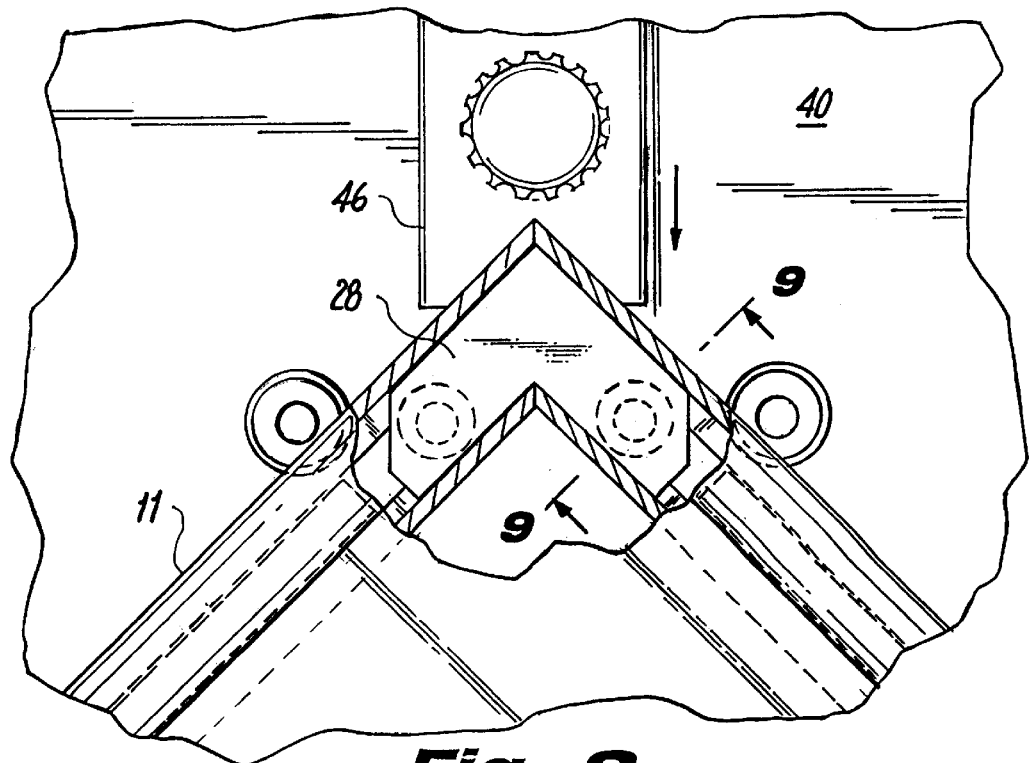
FIG. 8 is a top plan view, partially in section, showing a corner section of a picture frame in position on the assembly machine.

Although, the frame sections 12 may vary considerably in size, the corner pieces 28 are identical with each screw 34 positioned in the center of the opening 25 between the lips 24 at a known distance from the corner. Since this distance is known, by using the opening 25 as a means for aligning the adjacent frame sections, the proper position of the screw drivers 50 within the base 40 is also known. This alignment is provided by the guide rails 44 which engage the openings 25 of adjacent frame sections 12. As shown in FIGS. 7 and 8, once the frame sections 12 have been joined together on the base 40 in engagement with the guide rail 44, the screw drivers 50 will be aligned with the corner piece screws so long as they are aligned with the guide rails 44 and spaced the proper distance d from the corner. The adjustable corner bracket 46 is tightened after the corner section of the frame has been aligned on the machine to hold the frame in position during the tightening operation.

In operation, a corner section of a frame is place on the base as shown in FIG. 8, and the corner bracket positioned and tightened. The screw drivers 50, which are spring biased toward the frame by the springs 74, are pushed into engagement with the screws 34. As shown in FIG. 9, screw drivers 50 would not normally engage the slots in the screws, but when the motor is turned on, causing the screw drivers to rotate, the springs 74 will cause the screw drivers to move into the slots (not numbered) as shown in FIG. 10. Continued operation of the motor then tightens the screws simultaneously. When the screws have been tightened, because of the beveled driving edges 50B of the screw drivers, the continued torque applied to the screw drivers will cause them to unseat from the screws as shown in FIG. 11. Thus, by controlling the taper of the driving edges of the screw drivers 50 and the spring constant of the springs 74, proper tightening of the corner piece screws 34 can be assured.

The screw drivers will not necessarily disengage from the respective screws simultaneously. In this respect, they operate independently, with each one disengaging its associated screw when it has been tightened.

In the illustrated embodiments, each of the four corner pieces is separately tightened but the invention can also be used to tighten two or more corner pieces simultaneously.

The machine can be used with any number of screws, including one, for example a single screw positioned at the junction of the legs of the corner piece.

Depending on practical considerations, many different motors may be employed. A motor turning at 158 rpm and providing 12 inch-pounds of torque was found to tighten screws securely. A reversing switch (not shown) may be supplied for reversing the direction of rotation of the motor so that the invention can be used to unfasten the corner pieces if, for any reason, it is desired to disassemble the frame. The operation of the machine would be essentially the same as the operation during the assembly process.

An obvious advantage of the invention is the use of a machine to tighten the frame sections. This greatly reduces the time required to assemble a frame and, of course, is less tiring for the framer, particularly when many frames are involved. Another important benefit of the invention is that the framer can work "face up". That is, in using the invention, the framer can view the art work to make sure that it is aligned properly within the frame as the frame is tightened. In a purely manual process, it is difficult to check the alignment of the art work during the tightening procedure.

The machine is relatively small and can be provided as an accessory for a framing makeup table, in which case it would include some means for enabling it to be temporarily mounted on the table.

What is claimed is:

1. Apparatus for assembling a metal picture frame having mitred frame sections connected to each other by L-shaped corner pieces which have legs extending into receiving channels within the frame sections and screws in each leg accessible from the back of the frame through elongated openings in the frame sections, comprising:

a base on which a corner section of the frame can be supported, a pair of guide rails on the base for engaging the elongated openings of two adjacent frame sections, at least two screw drivers extending through said base at a position in which they are aligned with said screws when the openings of two frame sections engage the guide rails, and means for rotating said screw drivers to tighten said screws.

2. Apparatus according to claim 1, wherein said base includes an adjustable corner brace for securing a corner of the frame in a fixed position.

3. Apparatus according to claim 1, wherein said screw drivers are spring biased toward the frame and have edges to engage the screws.

4. Apparatus according to claim 3, wherein the edges of the screw drivers which engage the screws as they are tightened are beveled such that the screw drivers will disengage from the screws after the screws have been tightened.

5. Apparatus for assembling a metal picture frame having mitred frame sections connected to each other by L-shaped corner pieces which have legs extending into receiving channels within the frame sections and screws in each leg accessible from the back of the frame through elongated slots in the frame sections, comprising:

a base on which a corner section of the frame can be supported, a pair of guide rails on the base for engaging the elongated slots of two adjacent frame sections, an adjustable corner brace for securing a corner edge of the frame in a fixed position, at least two screw drivers extending through said base at a position in which they are aligned with said screws when the slots of two frame sections engage the guide rails and the corner edge of said two frame sections engages the brace, and means for rotating said screw drivers to tighten said screws.

6. Apparatus according to claim 5, wherein said screw drivers are spring biased toward the frame and have edges to engage the screws.

7. Apparatus according to claim 6, wherein the edges of said screw drivers which engage the screws as they are tightened are beveled such that they will disengage from the screws after they are tightened.

8. Apparatus for assembling a metal picture frame having mitred frame sections connected to each other by corner pieces which have legs extending into the frame sections and at least one screw accessible from the back of the frame through openings in the frame sections, comprising:

a base on which a corner section of the frame can be supported, a pair of guide members on the base for engaging the openings of two adjacent frame sections, at least one screw driver extending through said base at a position in which it is aligned with said screw when the openings of two frame sections engage the guide members whereby said screw driver can be turned to tighten said screw.

9. Apparatus according to claim 8, wherein said screw driver is spring biased toward the frame and has edges to engage the screw.

10. Apparatus according to claim 9, wherein the edges of said screw driver which engage the screw as it is tightened are beveled.

* * * * *